United States Patent [19]

Markovski

[11] 4,113,059
[45] Sep. 12, 1978

[54] HAND HELD DEVICE FOR PACKING GREASE INTO WHEEL BEARINGS

[76] Inventor: Ognian Markovski, 2715 Jalmia Dr., West Hollywood, Calif. 90046

[21] Appl. No.: 774,324

[22] Filed: Mar. 4, 1977

[51] Int. Cl.² ............................................. F01M 11/00
[52] U.S. Cl. ................................. 184/1 D; 184/105 R
[58] Field of Search .................. 184/1 D, 45 R, 45 A, 184/105 R

[56] References Cited

U.S. PATENT DOCUMENTS

| | | | |
|---|---|---|---|
| 2,168,746 | 8/1939 | Saal et al. | 184/1 D |
| 2,210,478 | 8/1940 | Berg | 184/1 D |
| 2,248,940 | 7/1941 | Berg | 184/1 D |
| 2,270,754 | 1/1942 | Ginter | 184/1 D |
| 2,369,178 | 2/1945 | Richmond et al. | 184/1 D |
| 2,438,128 | 3/1948 | Poyner | 184/1 D |
| 2,439,888 | 4/1948 | Ginter | 184/1 D |
| 2,498,090 | 2/1950 | MacIndoe | 184/45 R |
| 3,365,024 | 1/1968 | Freda | 184/1 D |

FOREIGN PATENT DOCUMENTS 390,009  7/1965  Switzerland ........................... 184/45 A

*Primary Examiner*—David H. Brown
*Attorney, Agent, or Firm*—Poms, Smith, Lande & Glenny

[57] ABSTRACT

A hand-held device for packing grease into wheel bearings including a housing having a grease inlet, a spring-biased piston and a cap closing off the bottom of the housing. The cap and piston are adapted to maintain a wheel bearing to be greased in a fixed position in the housing. Ports in the piston cooperate with the grease inlet for introducing grease under pressure above a bearing positioned in the housing for greasing the same. The cap is separable from the housing so that, after greasing the bearing, the cap may be removed and the bearing quickly and easily located. An opening may be provided in the cap for evacuating excess grease out of the housing and an adapter may be provided for quickly and easily cleaning the interior of the device.

8 Claims, 2 Drawing Figures

HAND HELD DEVICE FOR PACKING GREASE INTO WHEEL BEARINGS

BACKGROUND OF THE INVENTION

1. Field of the Invention

The invention relates to grease packing devices; and, more particularly, to a hand held device for packing grease into wheel bearings and means for cleaning the same.

2. Description of the Prior Art

Many different types of lubricating devices have been proposed in the past for lubricating bearings. However, such devices have not proven practical and most lubrication of wheel bearings is done by hand. Hand lubrication requires the operator to hold the bearing in one hand while inserting grease between the races with another. This of course is quite messy and the races cannot be filled without excessive grease falling on the equipment and exterior parts of the bearing. Much time is lost in removing such excessive grease.

In another method, a fixture or jig is used which pumps the grease through the wheel bearings. On completion of this packing operation, it is necessary for the operator to fish around in the grease to locate the bearing. Needless to say, this is also quite messy and results in considerable lost clean-up and wipe-off time.

There thus exists a need for a relatively simple and inexpensive device for quickly and easily packing wheel bearings with grease without the attendant mess and excessive lubrication and locating the same after greasing. Such a device should also have means for quickly and easily cleaning the device so that it does not become clogged and is ready for use to pack a subsequent bearing.

SUMMARY OF THE INVENTION

It is an object of this invention to provide a hand held device for packing grease into wheel bearings.

It is a further object of this invention to provide such a device in which a greased bearing may be quickly and easily located after lubrication of the same.

It is still another object of this invention to provide such a device which is adapted to receive excess grease after applying grease to a wheel bearing in a receptacle or the like.

It is still further an object of this invention to provide such a device with means for purging the same after use.

These and other objects are preferably accomplished by providing a housing having a grease inlet, a spring-biased piston and a cap closing off the bottom of the housing. The cap and piston are adapted to maintain a wheel bearing to be greased in a fixed position in the housing. Ports in the piston cooperate with the grease inlet for introducing grease under pressure above a bearing positioned in the housing for greasing the same. The cap is separable from the housing so that, after greasing the bearing, the cap may be removed and the bearing quickly and easily located. An opening may be provided in the cap for evacuating excess grease out of the housing and an adapter may be provided for quickly and easily cleaning the interior of the device.

DESCRIPTION OF THE PREFERRED EMBODIMENT

Figure 1:
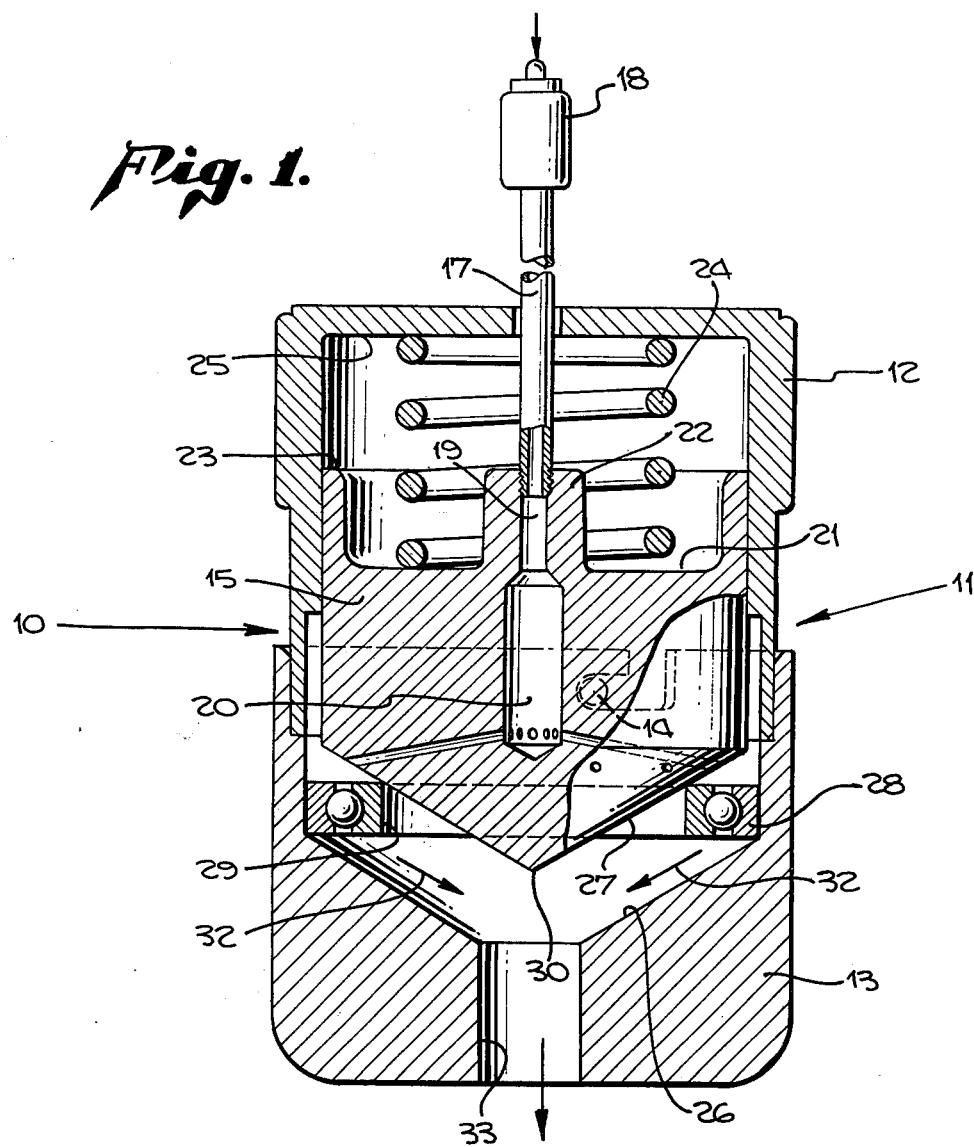
FIG. 1 of the drawing is a vertical sectional view of a hand held grease packing device in accordance with the teachings of my invention showing a wheel bearing positioned therein for applying grease thereto.

Referring now to FIG. 1, a grease packing device 10 is shown comprised of a housing 11. As particularly contemplated in the invention, housing 11 is comprised of two separable parts, a main upper housing portion 12 and a separable cap or lower housing portion 13. Housing portion 13 may be quickly and easily removable from upper housing portion 12 by releasable means such as a bayonet slot-type connection 14, as is well known in the art.

A piston 15 is provided in housing portion 12 having a throughpassage 16 fluidly communicating with an inlet 17 extending through housing portion 12 out the top thereof terminating in a conventional fitting 18. Fitting 18 is adapted to be coupled to a conventional grease gun (not shown) as is well known in the automotive industry. Thus, coupling such gun to fitting 18 and activating the same injects grease under pressure through inlet 17 to throughpassage 16. Throughpassage 16 may be provided with an upper passage 19, generally of the same diameter as the passageway through inlet 17, and a lower passage 20 preferably of a diameter greater than passage 19.

The upper portion of piston 15 may be configured to provide an annular recess 21 with a central hub 22 and a periperal side 23 retaining therein the lower end of a helical spring 24. The upper inner wall 25 of upper housing 12 acts as a stop for spring 24, spring 24 abutting thereagainst as shown in FIG. 1. Spring 24 encircles hub 22 and is retained in recess 21 between wall 23 and thus guided thereby and retained in position within device 10. Spring 24 biases piston 15 downwardly toward lower housing portion 13.

As particularly contemplated in the present invention, device 10 includes means for cooperating piston 15 with lower housing portion 13 for supporting a wheel bearing therein. In the exemplary embodiment of the invention, such means includes housing portion 13 having a generally conically-shaped portion 26 corresponding to the lower end 27 or bottom of piston 15 which is similarly configured. As will be further discussed, a conventional wheel bearing 28 is shown positioned in device 10 between the lower end 27 of piston 15 and portion 26 of lower housing portion 13. Bearing 28 has a central aperture 29 which receives the apex 30 of end 27 therein. The inner diameter of housing portion 13 above conically-shaped portion 26 is substantially the same as the outer diameter of bearing 28 as shown in FIG. 1. Thus, bearing 28, in FIG. 1, is supported on the upper side portions of conically-shaped portion 26.

As particularly contemplated in the present invention, means are provided for delivering grease from passageway 16 to bearing 28 and out of device 10. In the exemplary embodiment of the invention, such means includes a plurality of spaced ports or apertures 31 through the conical lower end 27 of piston 15 fluidly communicating with passageway 16. These apertures 31 open into the chamber or area formed above bearing 28 so that grease from passageway 16 exits out of apertures 31 onto bearing 28.

As indicated by arrows 32, the grease bypassing bearing 28 exits into a throughbore or passageway 33 where it is evacuated out of device 10 and thus may be evacuated into a suitable receptacle or container (not shown) or otherwise disposed of.

In operation, cap or lower housing portion 13 is removed via releasable means 14 from upper housing portion 12 and a bearing 28 to be greased is inserted therein. Cap 13 is then locked onto housing portion 12 with apex 30 of piston 15 entering aperture 29 in bearing 28 thereby supporting bearing 28 between piston 15 and surface 26. Piston 15 is biased upwardly against spring 24 as shown in Fig. 1.

A grease gun (not shown) is coupled to fitting 18 and grease under pressure is injected therein and exits out of ports 31 onto bearing 28 for greasing the same. Excess grease is evacuated out of opening or port 33 where it can be collected in a separate receptacle or container or otherwise disposed of.

Cap 13 may then be quickly and easily removed via means 14 with bearing 28, now well greased, easily locatable and contained on the conical surface 26.

Figure 2:
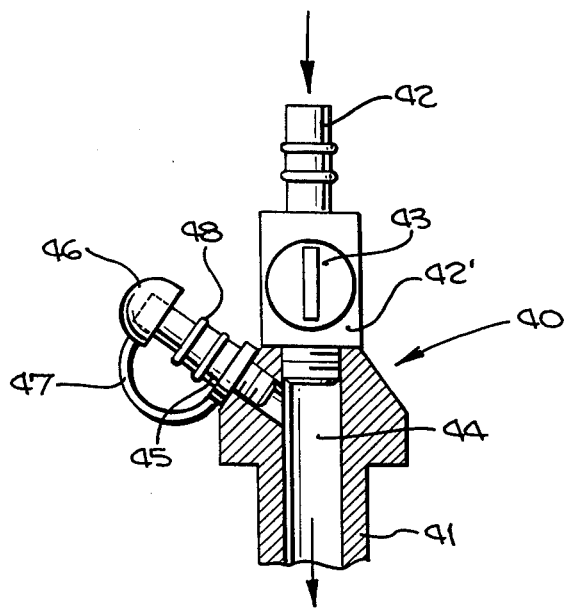
FIG. 2 is a vertical view, parly in sectional, of a fitting adapted to be inserted on the device of FIG. 1 for purging the same after greasing a wheel bearing.

After repeated use or anytime it is necessary to remove remaining grease from device 10, it may be desired to cleanse device 10. This may be quickly and easily accomplished by providing a separable adapter fitting 40 (FIG. 2) having a conventional fitting portion 41 similar to the fitting of the conventional grease gun (not shown) discussed herein with regard to FIG. 1. Thus, adapter fitting 40 is adapted, via portion 41, to be snap-fit into fitting 18 of FIG. 1. Fitting 40 includes an air inlet 42 adapted to be coupled to a source of air (not shown), such as an air hose or the like, leading to a main housing 41 having air volume adjusting means therein, such as a rotatable valve 43, adapted to adjust the volume of air flow through fitting 40. Valve 43 includes a suitable throughbore or passage communicating with both inlet 42 and a chamber 44 below valve 43 communicating with the inlet through fitting 18. A solvent fluid inlet 45 extends from chamber 44 to the exterior of fitting 40 for introducing solvent therein. A removable cap 46 closes off inlet 45 and is retained thereto by a flexible connection 47. The throughbore or passage through inlet 45 may be of a venturi-type for restricted flow. Inlet 45 may include suitable means thereon, such as ridges 48, for quickly and easily coupling inlet 45 to a source of a grease solvent (not shown). Thus, as the solvent enters chamber 44, it is entrained in the air introduced through inlet 42, the volume of flow being adjustable via valve 43, and the air-solvent mixture exits from chamber 44 to fitting 18 of FIG. 1 whereby it passes through passageway 16 out of ports 31 and out of opening 33 to thereby purge the interior of device 10.

It can be seen from the foregoing that I have described a device that may be used to quickly and easily grease a wheel bearing without mess or use of excessive grease, locate the same after greasing, then purge the device of any remaining grease.

I claim as my invention:

1. In a hand-held device for packing grease into a wheel bearing including a housing, a grease inlet for introducing grease under pressure into the interior of said housing, a spring-biased piston mounted in the interior of said housing, and means for positioning a wheel bearing with relation to said housing for greasing of the same, the improvement which comprises:
   said housing including a main body portion having said piston therein coupled to said grease inlet with fluid communication from said inlet, through said piston, and out of said piston, said fluid communication between the grease inlet and the exterior of said piston including a conduit interconnecting said grease inlet with an upper passageway through said piston, a lower passageway through said piston of a diameter greater than that of the upper passageway and in fluid communication therewith, and a plurality of spaced ports communicating with said lower passageway and opening on the exterior of said piston, and a releasable cap enclosing said piston, said cap and said main body portion including wheel bearing positioning means thereon comprising said piston having a surface configured similarly to the inner surface of said cap for positioning a wheel bearing between said piston surface and the inner surface of said cap whereby grease from said inlet is adapted to exit under pressure out of the ports of said piston and engage said wheel bearing for greasing the same, said configured surfaces of said piston and said cap being generally conically-shaped and the conical shape of said piston having an apex adapted to enter a central aperture in a wheel bearing positioned between said piston and said cap, said conical surface of said cap being adapted to retain a wheel bearing thereon in a manner forming a chamber in said device between said piston and the conical surface of said cap, said cap further including a chamber above said conical portion of said cap, said last-mentioned chamber having a peripheral wall of a diameter substantially the same as the outer diameter of a wheel bearing to be greased in said device whereby said bearing is retained between the peripheral wall and on the upper outer surfaces of said conical portion.

2. In the device of claim 1 including a throughbore extending through said cap to the exterior thereof and in fluid communication with the interior of said cap below a wheel bearing when said wheel bearing is positioned in said cap.

3. In the device of claim 1 wherein said cap and said main body portion includes releasable means thereon for quickly and easily releasing said cap from said main body portion.

4. In the device of claim 1 further including an adapter fitting having coupling means thereon for coupling said adapter fitting to said grease inlet to provide fluid communication therebetween, said fitting having an air inlet communicating with a chamber in said fitting in fluid communication with said coupling means, and a grease solvent inlet on said fitting in fluid communication with said fitting chamber.

5. In the device of claim 4 including air flow volume control means on said fitting for controlling the volume of air flow from said air inlet into said fitting chamber.

6. A hand-held device for greasing a wheel bearing comprising:
   a main housing portion;
   a separable lower housing portion having an inner surface forming a generally fluid-tight chamber between said main housing portion and said lower housing portion;
   a spring-biased piston mounted in said main housing portion having a generally conically shaped lower portion having an apex configured similarly to a conically-shaped portion on the inner surface of said lower housing portion;
   a grease inlet having an opening leading into said upper housing portion;

a fluid conduit through said piston in fluid communication with said grease inlet;

a plurality of spaced ports opening exteriorly of said piston above the apex of said conical portion of said piston in fluid communication with said fluid conduit through said piston; and an opening through said lower housing portion to the exterior thereof in fluid communication with said chamber.

7. In the device of claim 6 including an adapter fitting having coupling means for fluidly coupling said fitting to said grease inlet, said adapter fitting having an inner chamber and both an air inlet and a grease solvent inlet leading into said inner chamber for delivering aerated solvent from said adapter fitting and out of said opening.

8. In the device of claim 7 further including volume adjusting means operatively engaging both said inner chamber and said air inlet for adjusting the volume of air flow from said air inlet into said chamber.

* * * * *